(12) United States Patent
Darshan et al.

(10) Patent No.: US 6,986,071 B2
(45) Date of Patent: Jan. 10, 2006

(54) DETECTING NETWORK POWER CONNECTION STATUS USING AC SIGNALS

(75) Inventors: Yair Darshan, Petach Tiqva (IL); Alon Ferentz, Holon (IL); Dror Korcheraz, Bat-Yam (IL)

(73) Assignee: PowerDsine, Ltd., Hod Hasharon (IL)

( * ) Notice: Subject to any disclaimer, the term of this patent is extended or adjusted under 35 U.S.C. 154(b) by 511 days.

(21) Appl. No.: 10/279,269

(22) Filed: Oct. 24, 2002

(65) Prior Publication Data
US 2003/0146765 A1 Aug. 7, 2003

Related U.S. Application Data

(60) Provisional application No. 60/353,780, filed on Feb. 1, 2002.

(51) Int. Cl.
*G06F 1/32* (2006.01)

(52) U.S. Cl. ..................... 713/330; 700/286
(58) Field of Classification Search .............. 713/330
See application file for complete search history.

(56) References Cited

U.S. PATENT DOCUMENTS

| | | | |
|---|---|---|---|
| 4,237,450 A | 12/1980 | Canez | 340/571 |
| 4,510,401 A | 4/1985 | Legoult | 307/66 |
| 4,731,549 A * | 3/1988 | Hiddleson | 307/125 |
| 5,109,505 A * | 4/1992 | Kihara | 714/5 |
| 5,406,260 A | 4/1995 | Cummings et al. | 340/568 |
| 6,274,949 B1 * | 8/2001 | Lioux et al. | 307/64 |
| 6,311,279 B1 * | 10/2001 | Nguyen | 307/66 |
| 6,556,564 B2 * | 4/2003 | Rogers | 370/352 |
| 6,828,733 B1 * | 12/2004 | Crenshaw | 315/150 |
| 6,873,163 B2 * | 3/2005 | Bonnell et al. | 324/719 |

FOREIGN PATENT DOCUMENTS

| | | |
|---|---|---|
| JP | 07220883 | 8/1995 |
| JP | 08171426 | 7/1996 |
| JP | 08223920 | 8/1996 |
| JP | 00060220 | 2/2000 |
| JP | 02214274 | 7/2002 |
| WO | WO 99/53627 | 10/1999 |

OTHER PUBLICATIONS

PowerDsine Application Note 115, entitled: "Power Over LAN™: Building Power Ready Devices", PowerDsine Ltd, Hod Hasharon, Israel, 2002.
IEEE Draft P802.3af/D3.0, entitled: "Data Terminal Equipment (DTE) Power Via Media Dependent Interface (MDI)", IEEE Standards Department, Piscataway, New Jersey, 2001.
Presentation: "PSE Based Disconnect-Detection Alternative", by Yair Darshan, PowerDsine, Mar. 2002.

\* cited by examiner

*Primary Examiner*—Lynne H. Browne
*Assistant Examiner*—Anand B. Patel
(74) *Attorney, Agent, or Firm*—Simon Kahn

(57) ABSTRACT

A power supply subsystem for use in a local area network (LAN) includes a direct current (DC) power source, which supplies DC power to at least one of the nodes via at least one of the wire pairs used in communication cabling of the LAN, substantially without interfering with data communications. A signal generator generates a periodic time-varying signal and couples the time-varying signal into the at least one of the wire pairs. A control unit senses a time-varying voltage on the at least one of the wire pairs due to the time-varying signal generated by the signal generator, and responsive to the sensed time-varying voltage, controls the DC power supplied to the at least one of the nodes by the DC power source.

49 Claims, 4 Drawing Sheets

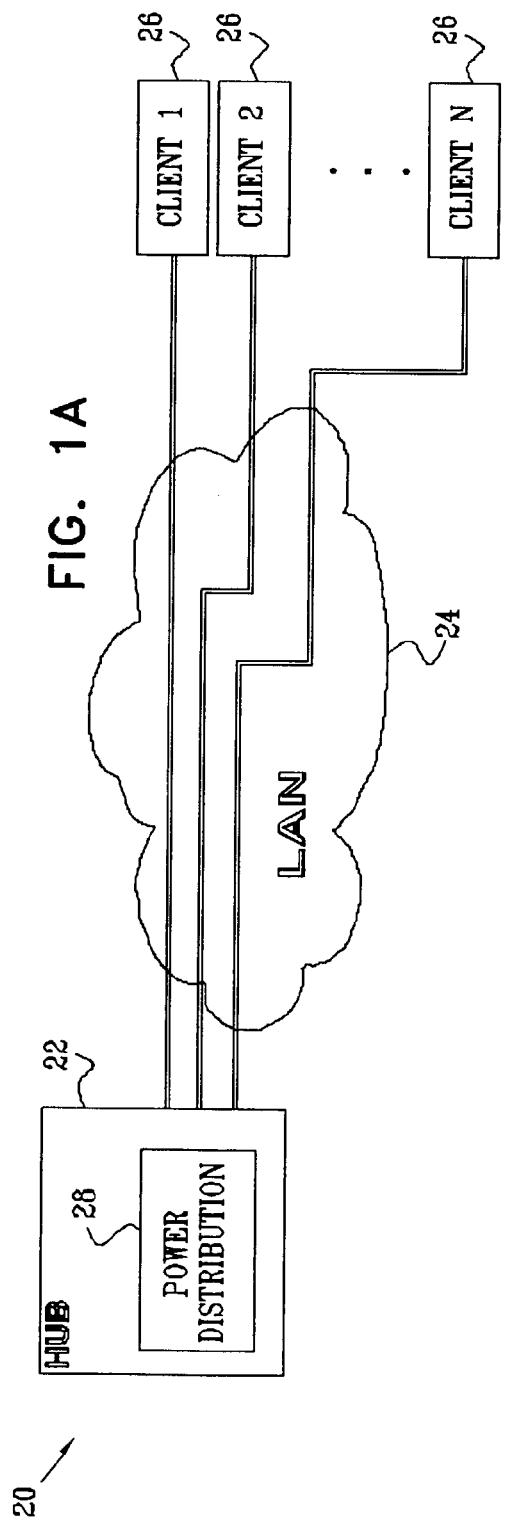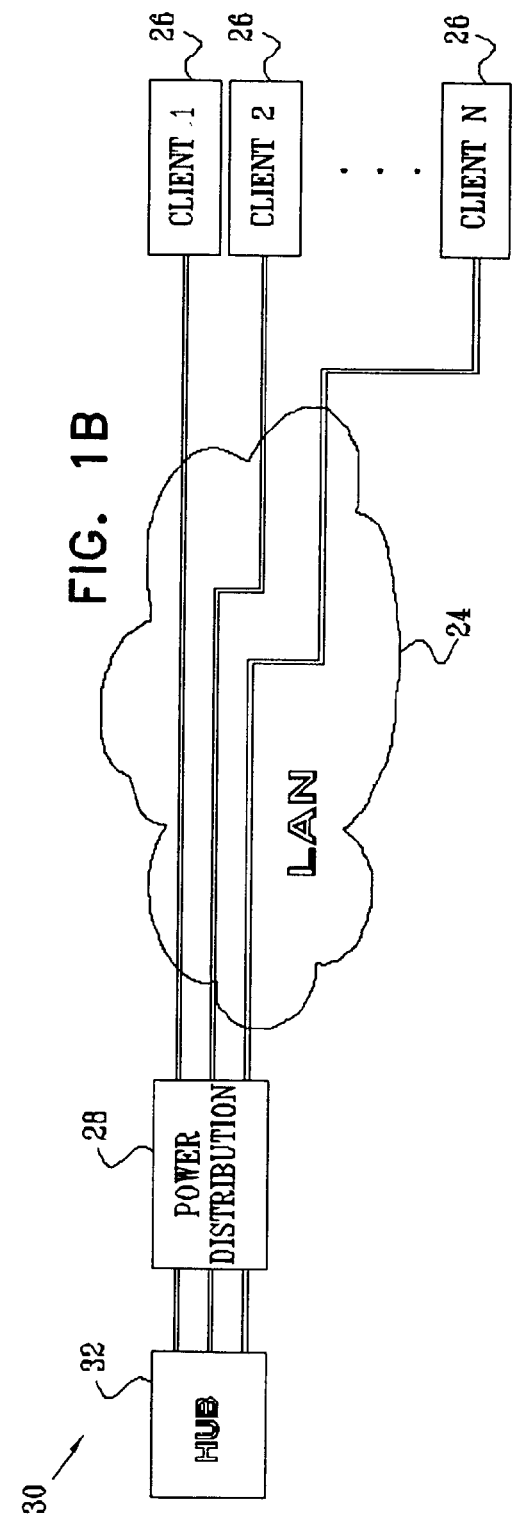

DETECTING NETWORK POWER CONNECTION STATUS USING AC SIGNALS

CROSS-REFERENCE TO RELATED APPLICATION

This application claims the benefit of U.S. Provisional Patent Application No. 60/353,780, filed Feb. 1, 2002, which is incorporated herein by reference.

FIELD OF THE INVENTION

The present invention relates generally to supplying DC power over a local area network (LAN), and specifically to methods and circuitry for detecting connection and disconnection of powered devices on the LAN.

BACKGROUND OF THE INVENTION

Power over LAN™ is a new technology that enables DC power to be supplied to Ethernet data terminals over ordinary Category 5 cabling. This technology enables the terminals to receive their operating power over the same Ethernet local area network (LAN) that they use for data communication. It thus eliminates the need to connect each terminal to an AC power socket, and to provide each terminal with its own AC/DC power converter. Further aspects of this technology are described in PowerDsine Application Note 115, entitled "Power over LAN™: Building Power Ready Devices" (PowerDsine Ltd., Hod Hasharon, Israel), which is incorporated herein by reference. The LAN MAN Standards Committee of the IEEE Computer Society is developing specifications for Power over LAN systems, as described in IEEE Draft P802.3af/D3.0, entitled "Data Terminal Equipment (DTE) Power via Media Dependent Interface (MDI)" (IEEE Standards Department, Piscataway, N.J., 2001), which is also incorporated herein by reference.

A Power over LAN system comprises an Ethernet switch and a power hub, which supplies DC power, along with a number of terminals, which communicate via the switch and draw power from the hub. The system is typically connected in a star topology, with each terminal linked by a dedicated cable to the switch and hub. DC power is carried to the loads (i.e., the terminals) over the twisted pairs of Category 5 cabling that are not needed for Ethernet data communications, or over the data-carrying pairs, depending on the system configuration, as specified in the 802.3af draft standard. The power sourcing equipment in the hub is commonly referred to as Power Sourcing Equipment (PSE), while each terminal that receives the power is referred to as a Powered Device (PD). The PSE may be integrated with the switch, in what is known as an "end-span" configuration, or it may alternatively be located between the switch and the terminals, in a "mid-span" configuration.

A LAN in which a PSE is operating may include not only PDs, but also legacy terminals that are not configured to receive power over the LAN. In order to avoid damaging legacy equipment by applying high DC voltage to their LAN connections, the PSE must be able to determine, for each of its power output ports, whether or not the output is connected to a PD. For this purpose, the IEEE 802.3af Draft requires that each PD include a "signature element"—a special circuit across the power input connections of the PD, with predefined impedance characteristics. When the PSE is powered up, or when a new terminal is added to the LAN, the PSE performs a line interrogation routine in order to detect the signature element. During the line interrogation phase, the remaining circuits of the PD (other than the signature element) are isolated from the line by a switch. Upon successful completion of the interrogation, the isolating switch is closed, and the PSE begins to supply power to the PD. The interrogation routine uses low-voltage signals, in order to avoid damaging legacy terminal equipment.

Once the PSE has begun to supply power to a PD, it must also be able to detect when the PD is disconnected from the LAN, in order to avoid leaving high DC voltage on the open line. For this purpose, the IEEE 802.3af Draft specifies that the PSE should continuously sense the DC current that it supplies to the PD. If the current drawn from a given output port of the PSE drops below a predetermined threshold for a certain period of time, the PSE shuts off its DC output voltage to that port. This disconnect detection mechanism solves the problem of leaving DC voltage on an open line, and it prevents equipment damage in the event that a legacy terminal is connected in place of the disconnected PD. The mechanism requires, however, that the PD consume a certain amount of current at all times, even when it is idle. Otherwise, the PSE will cut off power to the PD. There is no simple way under the current standard to automatically restore the power after it is cut off.

PCT Patent Publication WO 99/53627, whose disclosure is incorporated herein by reference, describes a system for generating and monitoring data over pre-existing conductors of a network. One of the purposes of this system is to detect when a piece of equipment is removed from the network. A central module on the network includes an isolation power supply, which applies continuous DC power to the data lines of the network. The central module may modulate this DC power at low frequency in order to convey status information to remote modules connected to the data lines. The remote modules may use the power supplied by the central module to return modulated low-frequency current signals to the central module. A receiver in the central module monitors the low-frequency current data on the data lines and is thus able to detect removal and relocation of the remote modules.

SUMMARY OF THE INVENTION

It is an object of some aspects of the present invention to provide improved methods and devices for detecting disconnection of a powered device (PD) from power sourcing equipment (PSE) on a LAN.

It is a further object of some aspects of the present invention to provide simple and reliable methods for determining connection status and characteristics of client devices that may be connected to a power distribution subsystem, such as a PSE.

In preferred embodiments of the present invention, a power distribution subsystem (typically a PSE) is configured to supply DC power over a LAN to client terminals connected to the LAN. The power distribution subsystem comprises a signal generator, in parallel with the DC power source, which adds a periodic, time-varying signal to the DC voltage that it supplies over the LAN. A control unit monitors the time-varying voltage component of the PSE output, in order to determine whether a client terminal is connected to the output and detect disconnection when it occurs. The magnitude and phase of the time-varying voltage at the PSE output are functions of the output impedance of the power distribution system itself and of the load impedance of the client terminal receiving power from the subsystem. If the client terminal is disconnected, the time-varying voltage level across the output impedance of the power distribution system changes sharply, enabling the system to detect the disconnection immediately. The detection point, at which the control unit determines whether the client terminal is connected or disconnected to the output, can be set so that the decision by the control unit is substantially independent of the DC current that is actually drawn by the client terminal.

While the use of a time-varying voltage on the DC power lines is particularly helpful in detecting disconnection of PDs in powered mode (after the interrogation phase has been completed), this time-varying voltage can also be used to detect initial connection and characteristics of powered devices, as well as changes in the status of the powered devices. Preferably, a controller of the power distribution subsystem measures the time-varying voltage signal across each power output port of the subsystem, and controls the DC power distribution accordingly. Substantially any suitable method of measurement may be used for this There is therefore provided, in accordance with a preferred embodiment of the present invention, a power supply subsystem for use in a local area network (LAN), which includes a plurality of LAN nodes coupled to a LAN switch by communication cabling, the cabling including multiple wire pairs connecting the plurality of nodes to the switch for providing data communication among the nodes, the power supply subsystem including:

a direct current (DC) power source, which is operative to supply DC power to at least one of the nodes via the communication cabling over at least one of the wire pairs substantially without interfering with the data communication;

a signal generator, which is operative to generate a periodic time-varying signal and to couple the time-varying signal into the at least one of the wire pairs; and a control unit, which is operative to sense a time-varying voltage on the at least one of the wire pairs due to the time-varying signal generated by the signal generator, and which is further operative, responsive to the sensed time-varying voltage, to control the DC power supplied to the at least one of the nodes by the DC power source.

Preferably, the control unit is operative to detect a disconnection of the at least one of the nodes from the cabling responsive to the time-varying voltage, wherein the control unit is operative, upon detecting the disconnection, to cut off the DC power supplied to the at least one of the nodes.

Alternatively or additionally, the control unit is operative to determine, responsive to the time-varying voltage, that the at least one of the nodes is connected to the at least one of the wire pairs. In a preferred embodiment, the control unit is further operative to make a determination, based on the time-varying voltage, that the at least one of the nodes is capable of receiving the DC power over the at least one of the wire pairs, and to turn on the DC power to the at least one of the nodes responsive to the determination. In another preferred embodiment, the control unit is operative to identify an operating mode of the at least one of the nodes based on the time-varying voltage, and to turn on the DC power to the at least one of the nodes responsive to the operating mode.

Preferably, the control unit is operative to determine an impedance characteristic of the at least one of the nodes based on the time-varying voltage. Further preferably, the control unit is operative to detect a change in the impedance characteristic by measuring a change in an amplitude of the time-varying voltage. Alternatively or additionally, the control unit is operative to detect a change in the impedance characteristic by measuring a change in a phase of the time-varying voltage. In a preferred embodiment, the impedance characteristic determined by the control unit is a complex impedance characteristic.

Preferably, the signal generator is coupled in parallel with the DC power source.

The DC power source may be connected to the LAN in an end-span configuration or in a mid-span configuration.

Typically, the DC power source is operative to generate a DC current over the at least one of the wire pairs, and the controller is operative to sense the time-varying voltage and to control the DC power responsive thereto substantially independently of the DC current flowing over the at least one of the wire pairs.

There is also provided, in accordance with a preferred embodiment of the present invention, a local area network (LAN), including:

a plurality of LAN nodes;

a LAN switch;

communication cabling including multiple wire pairs connecting the plurality of nodes to the switch for providing data communication among the nodes; and a power supply subsystem, which is operative to supply DC power to at least one of the nodes via the communication cabling over at least one of the wire pairs, substantially without interfering with the data communication, while coupling a periodic time-varying signal into the at least one of the wire pairs, and which is further operative to sense a time-varying voltage on the at least one of the wire pairs due to the time-varying signal and, responsive to the sensed time-varying voltage, to control the DC power supplied to the at least one of the nodes.

There is additionally provided, in accordance with a preferred embodiment of the present invention, a method for supplying power over a local area network (LAN), in which a plurality of LAN nodes are coupled to a LAN switch by communication cabling, the cabling including multiple wire pairs connecting the plurality of nodes to the switch for providing data communication among the nodes, the method including:

supplying DC power to at least one of the nodes via the communication cabling over at least one of the wire pairs substantially without interfering with the data communication;

coupling a time-varying signal into the at least one of the wire pairs;

sensing a time-varying voltage on the at least one of the wire pairs due to the time-varying signal generated by the signal generator; and responsive to the sensed time-varying voltage, controlling the DC power supplied to the at least one of the nodes.

There is further provided, in accordance with a preferred embodiment of the present invention, a control unit for a power supply subsystem for use in a local area network (LAN), the LAN including a plurality of LAN nodes coupled to a LAN switch by communication cabling, the cabling including multiple twisted wire pairs connecting the plurality of nodes to the switch for providing data communication among the nodes, the power supply subsystem including a direct current (DC) power source, which is operative to supply DC power to at least one of the nodes via the communication cabling over at least one of the wire pairs substantially without interfering with the data communication, and a signal generator, which is operative to generate a periodic time-varying signal and to couple the time-varying signal into the at least one of the wire pairs, wherein the control unit is operative to sense a time-varying voltage on the at least one of the wire pairs due to the time-varying signal generated by the signal generator, and is further operative, responsive to the sensed time-varying voltage, to control the DC power supplied to the at least one of the nodes by the DC power source.

The present invention will be more fully understood from the following detailed description of the preferred embodiments thereof, taken together with the drawings in which:

BRIEF DESCRIPTION OF THE DRAWINGS

FIGS. 1A and 1B are block diagrams that schematically illustrate systems for LAN communications and power distribution, in accordance with preferred embodiments of the present invention;

DETAILED DESCRIPTION OF PREFERRED EMBODIMENTS

Figure 2:
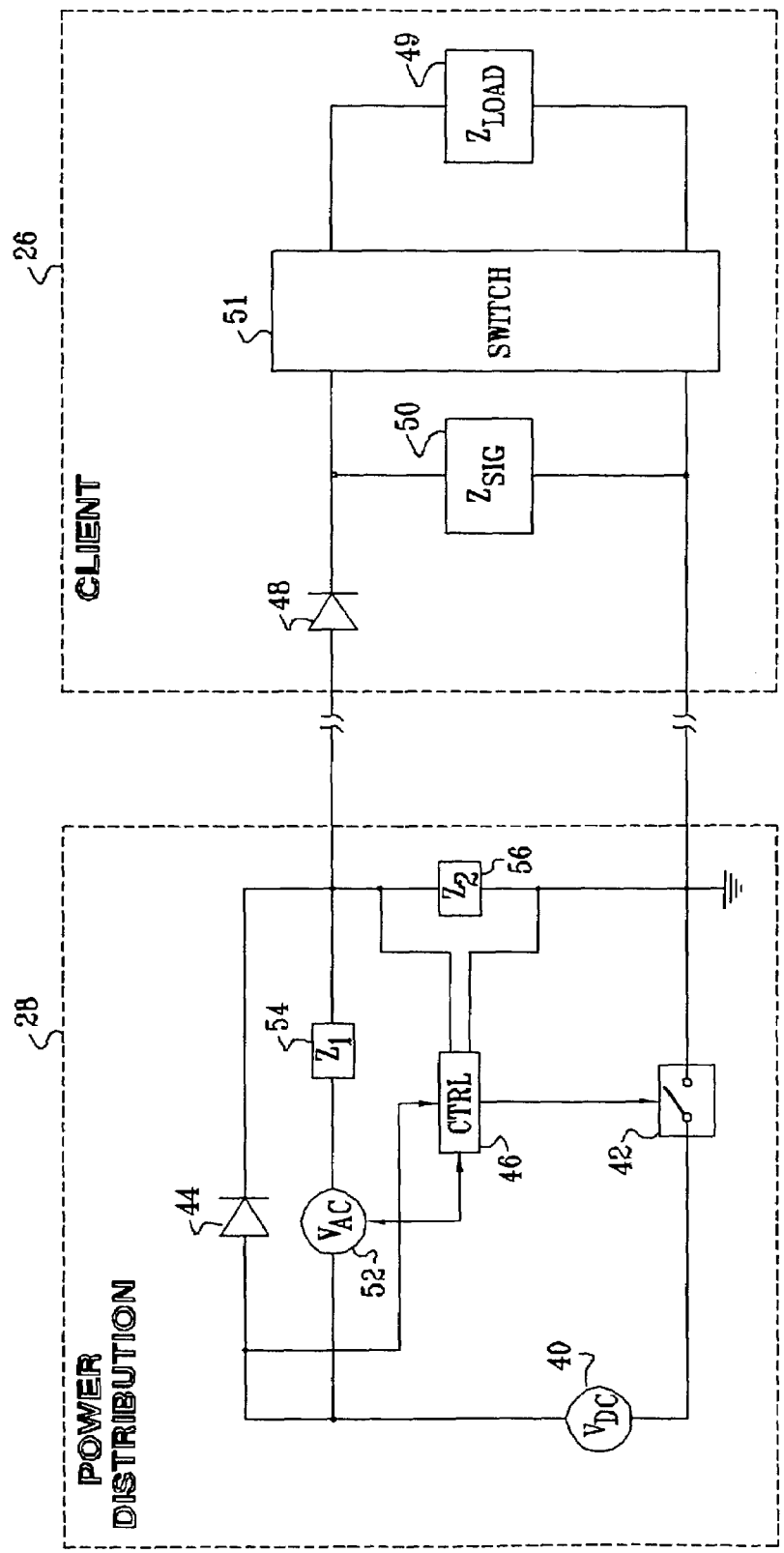
FIG. 2 is a block diagram that schematically illustrates elements of a power distribution unit and a client device, in accordance with a preferred embodiment of the present invention.

FIGS. 1A and 1B are block diagrams that schematically illustrate Power over LAN systems 20 and 30, respectively, based on the principles of the present invention. FIG. 1A shows an end-span configuration, in which a switching hub 22 comprises a master power distribution unit 28. Hub 22 communicates over a LAN 24 with single or multiple clients 26. FIG. 1B shows a mid-span configuration, in which unit 28 is located between a switching hub 32 and clients 26. In both embodiments, unit 28 supplies DC power over the LAN cables to those of clients 26 that are configured as PDs. In order to control the distribution of DC power to the clients, unit 28 couples a periodic, time-varying signal onto the LAN cables, and senses the resulting time-varying voltage on its output ports, as described in detail hereinbelow.

FIG. 2 is a block diagram that schematically shows details of power distribution unit 28 with one of clients 26, in accordance with a preferred embodiment of the present invention. The figure shows a single module of unit 28, for supplying power to a single client through one of the output ports of the power distribution unit. Typically, unit 28 comprises multiple modules of the type shown in FIG. 2, although some of the elements shown in the figure may be shared among a group of the modules or among all the modules, as will be apparent to those skilled in the art. FIG. 2 shows only those elements of unit 28 and client 26 that are pertinent to an understanding of the present invention. Additional system components needed to incorporate these elements in a complete Power over LAN system will similarly be evident to those skilled in the art.

Power distribution unit 28 comprises a DC power source 40, which is typically configured to supply 48 VDC in accordance with the 802.3af draft standard. The DC current output of source 40 passes through a switch 42 and a diode 44. Switch 42 is operated by a controller 46 to turn the DC power to client 26 on and off, depending on the identity (PD or non-PD) and status (connected or disconnected) of the client. Typically, controller 46 comprises a dedicated or semi-custom (ASIC) semiconductor chip. Alternatively, the controller may comprise a general-purpose microprocessor, with suitable software, and/or other standard components.

Client 26 typically comprises an optional diode 48 and a load 49, having a complex impedance $Z_{LOAD}$, which can generally be modeled as a resistance and capacitance in parallel. In PDs constructed in accordance with the 802.3af draft standard, client 26 also comprises a signature element 50 and a switch 51. The signature element provides a characteristic impedance, $Z_{SIG}$, which is typically greater than $Z_{LOAD}$. When unit 28 is first powered up, or when client 26 is initially connected to LAN 24, controller 46 carries out a line interrogation routine, during which it measures $Z_{SIG}$ and thus identifies the client as a PD able to receive DC power from unit 28. After successful completion of the line interrogation phase, switches 42 and 51 are closed, and load 49 (typically a DC/DC converter) begins to receive DC power from source 40.

In addition to the above-mentioned DC supply circuits, power distribution unit 28 comprises a time-varying signal source 52, which is used in detecting connection and disconnection of client 26, as described below. Typically, source 52 is configured to deliver a constant AC voltage, labeled $V_{AC}$ in the drawing. Alternatively, source 52 may generate substantially any sort of periodic, time-varying signal, which may have a DC component, in addition. Source 52 may generate the time-varying signal continuously, or it may operate in periodic bursts, and/or on command of controller 46. If a single AC source is shared among multiple ports of the power distribution unit, it may be time-multiplexed to poll the connection status of each of the ports in turn. In the embodiment shown in FIG. 2, time-varying source 52 is DC-biased by DC power source 40, but source 52 may alternatively be arranged in parallel to source 40, as shown below in FIG. 3. Alternative circuit arrangements will be apparent to those skilled in the art.

The time-varying voltage produced by source 52 passes through a series impedance 54, which has a complex value $Z_1$, to the output of unit 28, which has a shunt output impedance 56 of value $Z_2$. Typically, impedance 54 comprises a resistance, while impedance 56 comprises a capacitance and resistance in parallel, but other impedance configurations may likewise be used. Different configurations of impedances 54 and 56 can be created to form a low-pass or high-pass filter. It can be seen that impedances 54 and 56 act as a voltage divider on the output of source 52. $Z_2$ is preferably chosen to be substantially greater than $Z_{SIG}$ and $Z_{LOAD}$ at the operating frequency of source 52, while $Z_1$ is on the order of or less than the client impedance levels.

Controller 46 measures the time-varying voltage that appears across impedance 56. The effective client impedance, $Z_{PD}$, is determined by the parallel impedances $Z_{SIG}$ and $Z_{LOAD}$, as long as the client is connected to unit 28 and switch 51 is closed. Therefore, while client 26 remains connected to unit 28, the time-varying voltage component measured by controller 46 on impedance 56 is low, due to the relatively low impedance of the client. The peak-to-peak time-varying voltage measured across impedance 46 in this case is given approximately by $(V_{DC}+V_{AC})*Z_{PD}/(Z_1+Z_{PD}) -(V_{DC}-V_f)$, for $V_{DC}>V_f$, wherein $V_f$ is the forward voltage drop of diode 44. If $V_{DC}<V_f$, then the peak-to-peak time-varying voltage measured across impedance 46 is given approximately by $V_{AC}*Z_{PD}/(Z_1+Z_{PD})$. If client 26 is disconnected, however, the time-varying voltage across impedance 46 will increase sharply to about $(V_{DC}+V_{AC})*Z_2/(Z_1+Z_2)-(V_{DC}-V_f)$ for $V_{DC}>V_f$ or $V_{AC}*Z_2/(Z_1+Z_2)$ for $V_{DC}<V_f$.

Controller 46 senses the change in the voltage signal levels or phase difference or both across impedance 46, and immediately opens switch 42 if necessary, to shut off the DC output of unit 28. In either case, controller 46 uses the time-varying voltage to determine whether client 26 is connected or disconnected. By properly setting its decision threshold (based on either voltage or phase differences), the controller can ignore the effect of any DC current component drawn by the client in determining whether client 26 is connected or disconnected, regardless of whether the DC current is supplied by DC power source 40 or by source 52, or both.

Figure 3:
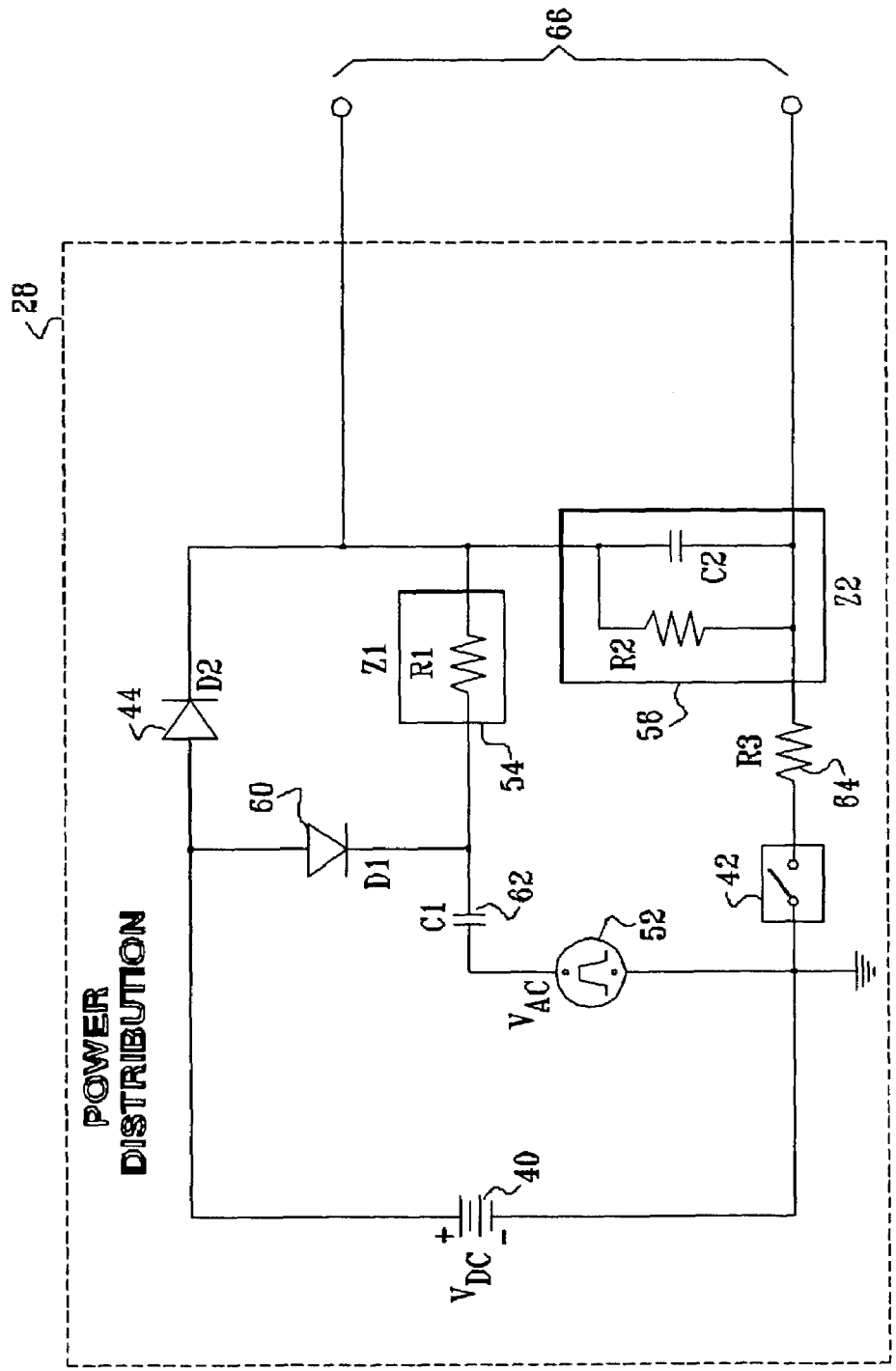
FIG. 3 is a schematic circuit diagram showing details of a power distribution unit, in accordance with a preferred embodiment of the present invention.

FIG. 3 is a schematic circuit diagram showing details of power distribution unit 28, in accordance with a preferred embodiment of the present invention. (For simplicity, controller 46 is not shown in this figure.) In the embodiment of FIG. 3, time-varying source 52 is in parallel with DC source 40. A diode 60 and a capacitor 62 are added, creating a voltage bias across capacitor 62 in order to help in reverse-biasing diode 44 when client 26 is disconnected. Alternatively, as noted above, source 52 may include its own DC bias, in which case diode 60 and capacitor 62 may be eliminated. As another alternative, in the absence of diode 60 and capacitor 62, source 52 may generate a high AC voltage, having a peak level greater than the DC voltage of source 40. In this case, a clamp circuit (such as a resistor and Zener diode in series) is preferably added in parallel to diode 44 in order to clamp the output voltage of unit 28 to a specified maximum value.

Impedance 54 is given by a selected resistor R1, in series with capacitor 62, labeled C1. Impedance 56 comprises a capacitor C2 and a resistor R2, which discharges C2 when switch 42 is opened. Capacitor C2 is useful for filtering high-frequency noise from the DC output of the power distribution unit. An additional resistor 64, labeled R3, represents the aggregate of additional series impedances typical of unit 28, including an inrush current limiter and a current sense resistor, as are known in the art. The frequency of source 52 and the values of the capacitors and resistors in unit 28 are preferably chosen so as to constitute a low-pass filter for the time-varying signal as long as client 26 is connected to port 66 (so that controller 46 senses a low AC voltage across the port), while giving a much higher voltage across the port when the client is disconnected. Alternatively, the components in unit 28 may be chosen to constitute a high-pass filter or any other impedance divider with respect to source 52. For proper operation, the following conditions should preferably be met:

$$\frac{(V_{AC} + V_{DC}) \cdot Z_2}{R_1 + Z_2} > V_{DC}, \text{ and } C1 > C2.$$

$Z_2$ may be deleted in some implementations, in which case this condition becomes simpler to meet. In the expression above, $V_{AC}$ is the peak voltage output of source 52.

Figure 4:
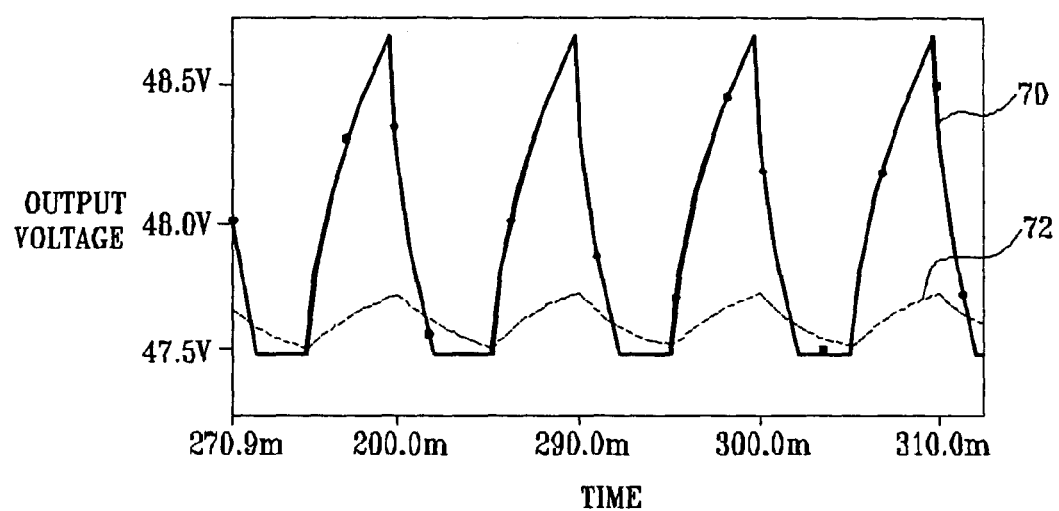
FIG. 4 is a plot of time-varying voltage waveforms detected by a power distribution unit (PSE) when a client device is connected to and disconnected from the PSE.

FIG. 4 is a plot of voltage measured on port 66 of unit 28 as a function of time under different operating conditions: a first trace 70 shows the voltage when client 26 is disconnected from the port, while a second trace 72 shows the voltage when the client is connected. These traces are taken from circuit simulations performed by the inventors, assuming source 52 to generate a 100 Hz AC signal. In the condition represented by trace 72, controller 46 has determined that client 26 is connected to port 66, and has therefore closed switch 42, so that source 40 supplies approximately 48 VDC to the client. For $Z_{PD}$ of 5 kΩ, the AC output of source 52 appears as a ripple of a few tenths of a volt across the output port. Higher $Z_{PD}$ will give a higher AC voltage across the port, and the decision threshold of controller 46 should be set accordingly. Preferably, the controller decision threshold is set to a point above the output voltage that would be generated for the highest possible $Z_{PD}$ that is specified for client 26 under all operating conditions.

When client 26 is disconnected, the AC amplitude increases to more than a volt, as shown by trace 70. Controller 46 may detect the change in the AC signal by periodically sampling the voltage across impedance 56 and/or by sensing changes in the phase of the AC signal, or by any other suitable method known in the art.

The circuits shown in FIGS. 2 and 3 and the method represented by FIG. 4 may be used not only to detect disconnection of client 26 from power distribution unit 28, but also to determine when a client has been newly connected and to measure impedance characteristics of the client. When client 26 is initially connected to unit 28, switch 51 (FIG. 2) is open, so that only signature element 50, with impedance $Z_{SIG}$, is connected across port 66, in parallel with impedance 56. The 802.3af draft standard at present provides for the PSE to apply a series of low DC voltage levels across its output port during the interrogation phase, in order to measure the real (resistive) part of the signature element impedance, and thus to identify client 26 as a PD. Unit 28, however, may apply a time-varying signal across $Z_{SIG}$, while measuring either or both of the amplitude and the phase of the voltage waveform on impedance 56. The amplitude of the waveform during the interrogation phase will typically be greater than that of waveform 72, but significantly less than that of waveform 70. Controller 46 may analyze the interrogation waveform to determine the complex impedance of element 50, including both the resistive and reactive parts, in order to verify that a proper PD has been connected to port 66.

Furthermore, different types of PDs may have different combinations of resistance and reactance, enabling the PSE to identify the different types based on their complex impedance characteristics, and to control its DC voltage output accordingly. Alternatively or additionally, the complex impedance characteristics may be used by the PSE to manage the amount of power delivered to the PD, and/or to convey coded information from the PD to the PSE. Client 26 may also be configured to alter its impedance characteristics dynamically in order to convey status information to the PSE.

Although preferred embodiments are described herein with particular reference to Power over LAN systems and applicable standards, the principles of the present invention may similarly be applied to other types of system for distribution of DC power. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A power supply subsystem for use in a local area network (LAN), which includes a plurality of LAN nodes coupled to a LAN switch by communication cabling, the cabling including multiple twisted wire pairs connecting the plurality of nodes to the switch for providing data communication among the nodes, the power supply subsystem comprising:

a direct current (DC) power source, which is operative to supply DC power to at least one of the nodes via the communication cabling over at least one of the wire pairs substantially without interfering with the data communication;

a signal generator, which is operative to generate a periodic time-varying signal and to couple the time-varying signal into the at least one of the wire pairs superimposed onto said supplied DC power;

and a control unit, which is operative to sense a time-varying voltage on the at least one of the wire pairs due to the time-varying signal generated by the signal generator, and which is further operative, responsive to the sensed time-varying voltage, to control the DC power supplied to the at least one of the nodes by the DC power source.

2. A subsystem according to claim 1, wherein the control unit is operative to detect a disconnection of the at least one of the nodes from the cabling responsive to the time-varying voltage.

3. A subsystem according to claim 2, wherein the control unit is operative, upon detecting the disconnection, to cut off the DC power supplied to the at least one of the nodes.

4. A subsystem according to claim 1, wherein the control unit is operative to determine, responsive to the time-varying voltage, that the at least one of the nodes is connected to the at least one of the wire pairs.

5. A subsystem according to claim 4, wherein the control unit is further operative to make a determination, based on the time-varying voltage, that the at least one of the nodes is capable of receiving the DC power over the at least one of the wire pairs, and to turn on the DC power to the at least one of the nodes responsive to the determination.

6. A subsystem according to claim 5, wherein the control unit is operative to identify an operating mode of the at least one of the nodes based on the time-varying voltage, and to turn on the DC power to the at least one of the nodes responsive to the operating mode.

7. A subsystem according to claim 1, wherein the control unit is operative to determine an impedance characteristic of the at least one of the nodes based on the time-varying voltage.

8. A subsystem according to claim 7, wherein the control unit is operative to detect a change in the impedance characteristic by measuring a change in an amplitude of the time-varying voltage.

9. A subsystem according to claim 7, wherein the control unit is operative to detect a change in the impedance characteristic by measuring a change in a phase of the time-varying voltage.

10. A subsystem according to claim 7, wherein the impedance characteristic determined by the control unit is a complex impedance characteristic.

11. A subsystem according to claim 1, wherein the signal generator is coupled in parallel with the DC power source.

12. A subsystem according to claim 1, wherein the DC power source is adapted to be connected to the LAN in an end-span configuration.

13. A subsystem according to claim 1, wherein the DC power source is adapted to be connected to the LAN in a mid-span configuration.

14. A subsystem according to claim 1, wherein the DC power source is operative to generate a DC current over the at least one of the wire pairs, and wherein the controller is operative to sense the time-varying voltage and to control the DC power responsive thereto substantially independently of the DC current flowing over the at least one of the wire pairs.

15. A local area network (LAN), comprising:
a plurality of LAN nodes;
a LAN switch;
communication cabling comprising multiple twisted wire pairs connecting the plurality of nodes to the switch for providing data communication among the nodes;
and a power supply subsystem, which is operative to supply DC power to at least one of the nodes via the communication cabling over at least one of the wire pairs, substantially without interfering with the data communication, while coupling a periodic time-varying signal superimposed onto said supplied DC power into the at least one of the wire pairs, and which is further operative to sense a time-varying voltage on the at least one of the wire pairs due to the time-varying signal and, responsive to the sensed time-varying voltage, to control the DC power supplied to the at least one of the nodes.

16. A LAN according to claim 15, wherein the power supply subsystem is operative to detect a disconnection of the at least one of the nodes from the cabling responsive to the time-varying voltage.

17. A LAN according to claim 16, wherein the power supply subsystem is operative, upon detecting the disconnection, to cut off the DC power supplied to the at least one of the nodes.

18. A LAN according to claim 15, wherein the power supply subsystem is operative to determine, responsive to the time-varying voltage, that the at least one of the nodes is connected to the at least one of the wire pairs.

19. A LAN according to claim 18, wherein the power supply subsystem is further operative to make a determination, based on the time-varying voltage, that the at least one of the nodes is capable of receiving the DC power over the at least one of the wire pairs, and to turn on the DC power to the at least one of the nodes responsive to the determination.

20. A LAN according to claim 19, wherein the power supply subsystem is operative to identify an operating mode of the at least one of the nodes based on the time-varying voltage, and to turn on the DC power to the at least one of the nodes responsive to the operating mode.

21. A LAN according to claim 15, wherein the power supply subsystem is operative to determine an impedance characteristic of the at least one of the nodes based on the time-varying voltage.

22. A LAN according to claim 21, wherein the power supply subsystem is operative to detect a change in the impedance characteristic by measuring a change in an amplitude of the time-varying voltage.

23. A LAN according to claim 22, wherein the power supply subsystem is operative to detect a change in the impedance characteristic by measuring a change in a phase of the time-varying voltage.

24. A LAN according to claim 22, wherein the impedance characteristic determined by the power supply subsystem is a complex impedance characteristic.

25. A LAN according to claim 15, wherein the power supply subsystem is connected to the LAN in an end-span configuration.

26. A LAN according to claim 15, wherein the power supply subsystem is connected to the LAN in a mid-span configuration.

27. A LAN according to claim 15, wherein the power supply subsystem is operative to generate a DC current over the at least one of the wire pairs, and to sense the time-varying voltage and to control the DC power responsive thereto substantially independently of the DC current flowing over the at least one of the wire pairs.

28. A method for supplying power over a local area network (LAN), in which a plurality of LAN nodes are coupled to a LAN switch by communication cabling, the cabling including multiple twisted wire pairs connecting the plurality of nodes to the switch for providing data communication among the nodes, the method comprising:
supplying DC power to at least one of the nodes via the communication cabling over at least one of the wire pairs substantially without interfering with the data communication;
coupling a time-varying signal superimposed onto said supplied DC power into the at least one of the wire pairs;
sensing a time-varying voltage on the at least one of the wire pairs due to the time-varying signal generated by the signal generator; and responsive to the sensed time-varying voltage, controlling the DC power supplied to the at least one of the nodes.

29. A method according to claim 28, wherein sensing the time-varying voltage comprises detecting a disconnection of the at least one of the nodes from the cabling responsive to the time-varying voltage.

30. A method according to claim 29, wherein controlling the DC power comprises, upon detecting the disconnection, cutting off the DC power supplied to the at least one of the nodes.

31. A method according to claim 28, wherein sensing the time-varying voltage comprises determining, responsive to the time-varying voltage, that the at least one of the nodes is connected to the at least one of the wire pairs.

32. A method according to claim 31, wherein controlling the DC power comprises making a determination, based on the time-varying voltage, that the at least one of the nodes is capable of receiving the DC power over the at least one of the wire pairs, and turning on the DC power to the at least one of the nodes responsive to the determination.

33. A method according to claim 32, wherein controlling the DC power further comprises identifying an operating mode of the at least one of the nodes based on the time-varying voltage, and controlling the DC power to the at least one of the nodes responsive to the operating mode.

34. A method according to claim 28, wherein sensing the time-varying voltage comprises determining an impedance characteristic of the at least one of the nodes based on the time-varying voltage.

35. A method according to claim 34, wherein determining the impedance characteristic comprises detecting a change in the impedance characteristic by measuring a change in an amplitude of the time-varying voltage.

36. A method according to claim 34, wherein determining the impedance characteristic comprises detecting a change in the impedance characteristic by measuring a change in a phase of the time-varying voltage.

37. A method according to claim 34, wherein determining the impedance characteristic comprises determining a complex impedance characteristic.

38. A method according to claim 28, wherein supplying the DC power comprises generating a DC current over the at least one of the wire pairs, and wherein sensing the time-varying voltage and controlling the DC power comprise sensing the time-varying voltage and controlling the DC power responsive thereto substantially independently of the DC current flowing over the at least one of the wire pairs.

39. A control unit for a power supply subsystem for use in a local area network (LAN), the LAN including a plurality of LAN nodes coupled to a LAN switch by communication cabling, the cabling including multiple twisted wire pairs connecting the plurality of nodes to the switch for providing data communication among the nodes, the power supply subsystem including a direct current (DC) power source, which is operative to supply DC power to at least one of the nodes via the communication cabling over at least one of the wire pairs substantially without interfering with the data communication, and a signal generator, which is operative to generate a periodic time-varying signal and to couple the time-varying signal superimposed onto said supplied DC power into the at least one of the wire pairs,
wherein the control unit is operative to sense a time-varying voltage on the at least one of the wire pairs due to the time-varying signal generated by the signal generator, and is further operative, responsive to the sensed time-varying voltage, to control the DC power supplied to the at least one of the nodes by the DC power source.

40. A control unit according to claim 39, wherein the control unit is operative to detect a disconnection of the at least one of the nodes from the cabling responsive to the time-varying voltage.

41. A control unit according to claim 40, wherein the control unit is operative, upon detecting the disconnection, to cut off the DC power supplied to the at least one of the nodes.

42. A control unit according to claim 39, wherein the control unit is operative to determine, responsive to the time-varying voltage, that the at least one of the nodes is connected to the at least one of the wire pairs.

43. A control unit according to claim 42, wherein the control unit is further operative to make a determination, based on the time-varying voltage, that the at least one of the nodes is capable of receiving the DC power over the at least one of the wire pairs, and to turn on the DC power to the at least one of the nodes responsive to the determination.

44. A control unit according to claim 43, wherein the control unit is operative to identify an operating mode of the at least one of the nodes based on the time-varying voltage, and to turn on the DC power to the at least one of the nodes responsive to the operating mode.

45. A control unit according to claim 39, wherein the control unit is operative to determine an impedance characteristic of the at least one of the nodes based on the time-varying voltage.

46. A control unit according to claim 45, wherein the control unit is operative to detect a change in the impedance characteristic by measuring a change in an amplitude of the time-varying voltage.

47. A control unit according to claim 45, wherein the control unit is operative to detect a change in the impedance characteristic by measuring a change in a phase of the time-varying voltage.

48. A control unit according to claim 45, wherein the impedance characteristic determined by the control unit is a complex impedance characteristic.

49. A control unit according to claim 39, wherein the DC power source is operative to generate a DC current over the at least one of the wire pairs, and wherein the controller is operative to sense the time-varying voltage and to control the DC power responsive thereto substantially independently of the DC current flowing over the at least one of the wire pairs.

* * * * *